United States Patent [19]
Beach et al.

[11] Patent Number: 6,160,934
[45] Date of Patent: Dec. 12, 2000

[54] HOLLOW LENSING DUCT

[75] Inventors: Raymond J. Beach, Livermore; Eric C. Honea, Sunol; Camille Bibeau, Dublin; Scott Mitchell, Tracy; John Lang; Dennis Maderas, both of Pleasanton; Joel Speth, San Ramon; Stephen A. Payne, Castro Valley, all of Calif.

[73] Assignee: The Regents of the University of California, Oakland, Calif.

[21] Appl. No.: 09/182,155

[22] Filed: Oct. 29, 1998

[51] Int. Cl.[7] ........................................................ G02B 6/32
[52] U.S. Cl. .................................. 385/33; 385/31; 372/101
[58] Field of Search ...................................... 385/33, 31, 88, 385/93, 902; 359/710, 625, 581, 346, 589; 372/101, 75, 69, 70, 34, 39, 67, 92, 93

[56] References Cited

U.S. PATENT DOCUMENTS 5,307,430  4/1994  Beach et al. .............................. 385/31
5,936,984  8/1999  Meissner ................................... 372/34

OTHER PUBLICATIONS

R.J. Beach, "Theory and optimization of lens ducts," Applied Optics, vol. 35, pp. 2005–2015, Apr. 1996.

Primary Examiner—Phan T. H. Palmer
Attorney, Agent, or Firm—John P. Wooldridge; Alan H. Thompson

[57] ABSTRACT

A hollow lensing duct to condense (intensify) light using a combination of focusing using a spherical or cylindrical lens followed by reflective waveguiding. The hollow duct tapers down from a wide input side to a narrow output side, with the input side consisting of a lens that may be coated with an antireflective coating for more efficient transmission into the duct. The inside surfaces of the hollow lens duct are appropriately coated to be reflective, preventing light from escaping by reflection as it travels along the duct (reflective waveguiding). The hollow duct has various applications for intensifying light, such as in the coupling of diode array pump light to solid state lasing materials.

18 Claims, 2 Drawing Sheets

HOLLOW LENSING DUCT

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to light intensifiers, particularly to devices for focusing down a beam of light to produce a smaller beam with a greater intensity, and more particularly to a hollow lensing duct for intensifying light using a combination of front surface lensing and reflective waveguiding.

2. Description of Related Art

Traditionally, solid optically pumped lasers consist of a solid material where the optical gain in the material is generated by stimulated emission. The laser rod was initially optically pumped by a flash lamp or an arc source, which was generally inefficient and the heat generated by the pumping means sometimes damaged the laser rod.

In an effort to develop more efficient solid state lasers which generate higher output power and have a longer life time, the use of lateral pumping means, such as solid state laser diode arrays that are mounted on the side of a laser slab, was initiated. Various approaches for efficient transfer of the energy from the diode arrays to the solid laser rod or slab have been developed, which include the use of reflective coatings, optical waveguides, collimating lenses, and prisms.

One of the existing problems associated with the use of large diode arrays to pump lasing material is effectively concentrating the light from a diode array onto the laser slab or rod. U.S. Pat. No. 5,307,430, directed to a lensing duct, provided a solution to that problem by condensing and increasing the intensity of pump light from a diode array onto a solid laser rod by a combination of front surface lensing and reflective waveguiding via a lensing duct constructed from inexpensive glass or plastic.

More specifically. U.S. Pat. No. 5,307,430 is directed to a lensing duct that condenses/intensifies light by using a combination of front surface lensing and reflective waveguiding. The patent discloses a wider, lens-shaped input side coated with an antireflective coating, four uncoated side surfaces that use total internal reflection to prevent light from escaping, and a narrower output side. The patent does not disclose the use of a hollow structure for that portion of the lens duct that serves to confine the light by total internal reflection in combination with a front lens containing a hole.

The solid lens ducts, described in U.S. Pat. No. 5,307,430, which is incorporated herein by reference, are optical devices that have found application in the coupling of pump radiation from extended two-dimensional semiconductor laser diode arrays into solid-state laser gain media. The operation of these devices relies on the combined effects of lensing at the curved input surface and channeling by total internal reflection off the canted sides. These devices are fabricated out of a single piece of transparent optical material. One drawback of the patented lens duct, in certain situations, is that it obstructs access to the end of the laser rod or slab and so requires the high-reflector-laser coating to be applied directly to the end of the rod or slab.

SUMMARY OF THE INVENTION

It is an object of the present invention to provide a hollow lens duct.

It is an object of the present invention to avoid obstructing the access to the end of a laser rod or slab by extending the basic idea disclosed in U.S. Pat. No. 5,307,430 to a hollow lens duct.

An embodiment of the hollow lens ducts of the present invention has a lens at its input end with a small hole located in the lens to allow optical access to the end of the laser rod or slab at which the lens duct is located. This configuration provides optical access to the end of the laser rod or slab, such that pump geometries are enabled in which the rod or slab may be pumped at both ends.

The lens duct may be formed with a focusing lens and canted surfaces that, by reflection, transfer pump light down to the small end of the lens duct where the laser light may be delivered to the pump input end of a laser rod. This embodiment includes a laser diode array configured with a break in its center to allow the laser cavity radiation to exit the pump delivery assembly without any interference from these components. In this laser configuration, pump light from the laser diode array is focused by the lens duct into the pump input end of a laser rod. The input end consists of an undoped YAG flanged end cap that is diffusion bonded to the doped portion of the laser rod. In general the pump light that is delivered through the hollow lensing duct to the laser rod suffers some depolarization due to the fact that it may make multiple reflections in traversing the lensing duct that do not preserve polarization.

A birefringence compensated power oscillator that utilizes the hollow lens duct is disclosed. Having optical access to both ends of the laser rod also allows cavity configurations in which the laser rod or slab is pumped from both ends. Such double-ended pump configurations are useful for both laser oscillator and laser amplifier applications.

The hollow lensing duct shown is designed such that the focal length of the lens at the large end of the device has a focal length approximately equal to the axial length of the device. This lens serves to focus down light, which approaches from the left-hand side-in the figure, to a focal spot located near the end of the tapered region of the lensing duct. The hole in the lens is located such that it is on the axis of the lensing duct and is approximately of the same size or slightly larger than the exit hole at the small end of the lensing duct. The reflective sides of the hollow lens duct may be planar, or can be continuously curved, as in a funnel, with a round input end and a round output end. Alternatively, the sides can be continuously graded shapes that take a rectangular input end down to a circular output end. Additionally, variously shaped exit holes beyond simple squares or circles, such as rectangles, octagons, and ovals, are also possible.

The reflective sides of the lens duct can be fabricated, e.g., by machining an appropriately shaped cavity in a solid piece of metal, followed by polishing, and, if appropriate, applying a highly reflective coating such as gold or silver. The lens at the input surface will generally be an ordinary, commercially available lens that is modified by cutting it to the shape of the input aperture and by fabricating a hole in its center to allow optical access to the end of the laser rod or slab. The optical access hole may have a variety of shapes. For example, if a hollow lens duct were to be used to pump a laser slab with a rectangular input aperture, then it might be advantageous to have the optical access hole fabricated with a rectangular cross-section to match this aperture.

DETAILED DESCRIPTION OF THE INVENTION

The present invention avoids obstructing access to the end of a laser rod or slab by extending the basic idea disclosed in U.S. Pat. No. 5,307,430 to a hollow lens duct. These hollow lens ducts have a lens at their input end with a small hole located in the lens to allow optical access to the end of the laser rod or slab at which the lens duct is located. Additionally, because the use of hollow lens ducts allows optical access to the end of the laser rod or slab, pump geometries are enabled in which the rod or slab may be pumped at both ends.

The present invention can be used for pump delivery for diode-pumped solid-state laser oscillators, and amplifiers. It can also be employed as a pump delivery for laser sources for material processing, weapons applications, remote sensing, medical applications, and antisensor applications.

In many laser systems that now use the conventional lens duct end-pumping technology, it would be advantageous to have optical access to the pumped end of the laser rod or slab. This would give the laser designer more freedom in the location of optical components in the laser cavity and more choices in the layout of the laser resonator. In other situations, it is absolutely essential to have access to both ends of the laser rod, so at the present time these systems cannot use the conventional solid lens duct end-pumping technology. As an example, the laser system depicted in FIG. 1 needs to have cavity elements located at each end of the laser rod and so is only possible by using a hollow lens duct to deliver the pump light.

Figure 1:
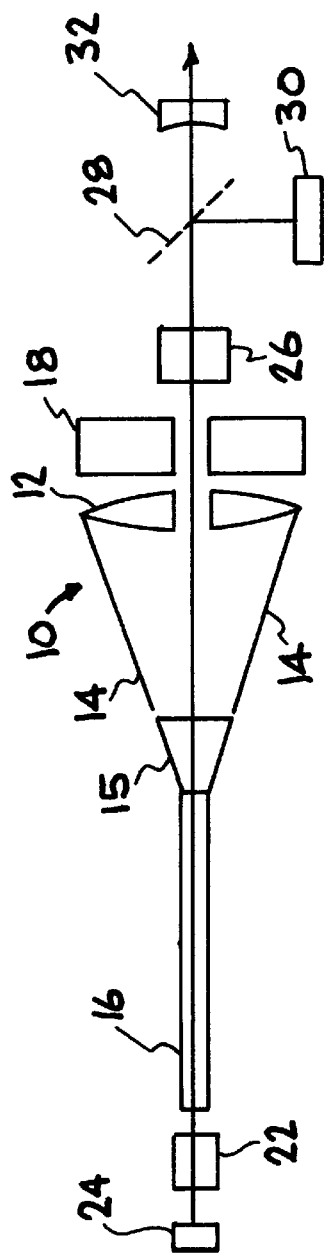
FIG. 1 shows a laser system that uses a hollow lens duct to deliver the pump light and includes cavity elements located at each end of the laser rod.

In FIG. 1, the lens duct 10 is formed by a focusing lens 12 and canted surfaces 14 that, by total internal reflection (TIR), transfer pump light down to the small end of the lens duct where it is delivered to the pump input end 15 of the laser rod 16. Additionally, the laser diode array 18 is configured with a break in its center to allow the laser cavity radiation to exit the pump delivery assembly without any interference from these components. In this laser configuration, pump light from laser diode array 18 is focused by lens duct 10 into the pump input end 15 (e.g., undoped YAG) of a laser rod. The input end 15, in this case, consists of an undoped YAG flanged end cap that is diffusion bonded to the doped portion of the laser rod 16 (e.g., Yb:YAG). In general the pump light that is delivered through the hollow lensing duct to the laser rod suffers some depolarization due to the fact that it may make multiple reflections in traversing the lensing duct that do not preserve polarization.

As an example of a laser cavity that can benefit from the use of a hollow tensing duct, FIG. 1 shows a birefringence compensated power oscillator. After one complete round trip oscillation in the laser cavity, the light traveling toward the left (away from the tensing duct) begins in a linear polarization state due to the presence of the intracavity polarizer beamsplitter 28 which it has passed through. Due to stress induced birefringence, which may be present in the laser rod, this light can then become depolarized as it passes through and is amplified within the laser rod 16. Emerging from the laser rod, the light then passes through a 45 degree Faraday rotator 22, is reflected from high reflector 24 and again passes through Faraday rotator 22 for a net polarization rotation of 90 degrees. The laser light now retraces its path through the laser rod in reverse, and due to the 90 degree polarization rotation introduced by the Faraday rotator, emerges from the laser rod in a linearly polarized state that is orthogonal to the input polarization state. The laser light now traveling along the optical axis, in the direction of the pump input end 15, passes through the opening in the hollow tensing duct 10 and the laser diode array 18. The light then passes through optional acousto-optic Q-switch 26 and then is reflected from the polarizing beamsplitter 28 onto the second high reflector 30. Light reflected from high reflector 30 travels back along the optical axis 20 to repeat the beam path described above until it arrives at the output coupler 32 upon which some portion is transmitted outside of the laser cavity and the remainder is reflected and so retraces the optical path described above. Several other configurations of this system are also possible. For example, the system may exclude the Q-switch and subsequently generate long pulse or continuous wave laser radiation.

Figure 2:
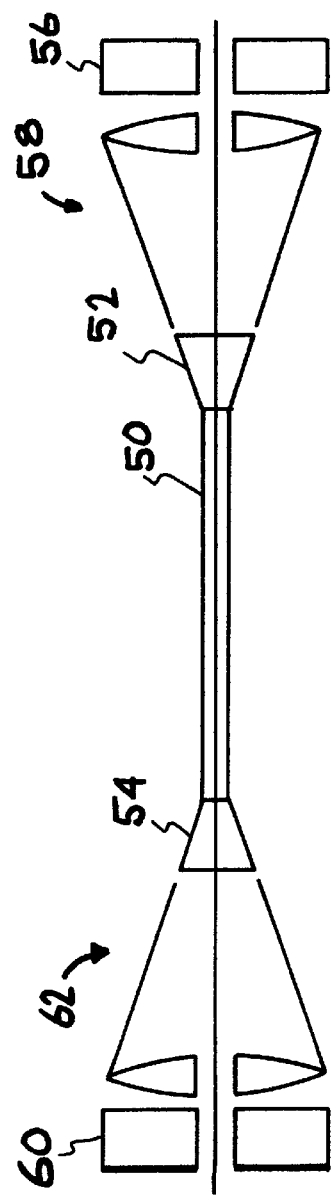
FIG. 2 shows a double-ended pump configuration in which the laser rod or slab is pumped from both ends.

Having optical access to both ends of the laser rod also allows cavity configurations in which the laser rod or slab is pumped from both ends as shown in FIG. 2. Such double-ended pump configurations are useful for both laser oscillator and laser amplifier applications. The double-ended configuration of FIG. 2 includes a laser rod 50 with two pump-input ends 52 and 54. Light from laser diode array 56 travels through hollow lens duct 58 and enters laser rod 50 through pump input end 52. Light from laser diode array 60 travels through hollow lens duct 62 and enters laser rod 50 through pump input end 54. This system can be used as an optical amplifier or can be configured to operate as a laser oscillator.

Figure 3:
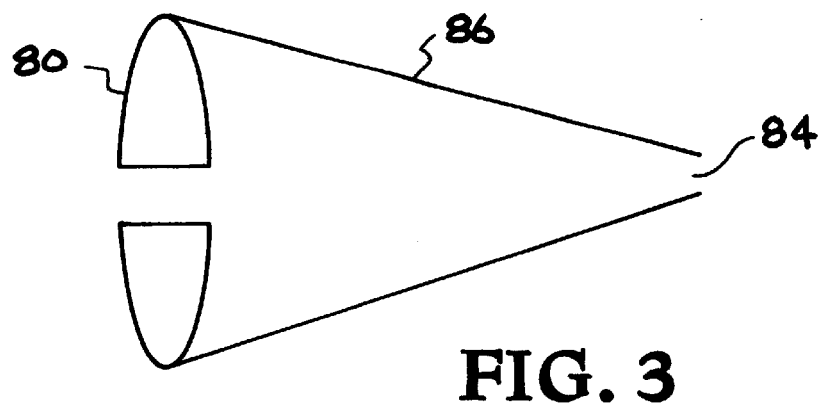
FIG. 3 shows an embodiment of a hollow lens duct that includes planar sides.
Figure 4A:
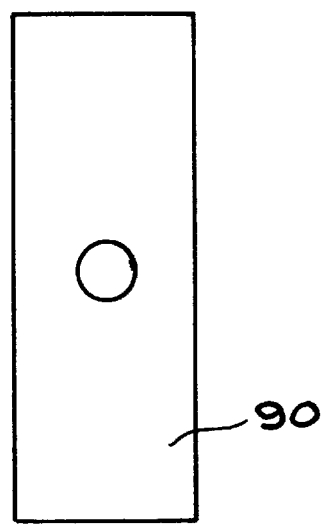
FIG. 4A shows a rectangular input end of a hollow lens duct.
Figure 4B:
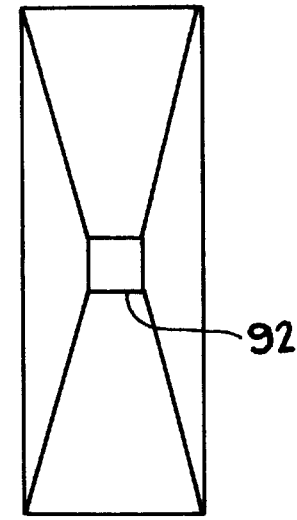
FIG. 4B shows the output end of the hollow lens duct of FIG. 4A.

The hollow lensing duct shown in FIG. 3 is designed such that the focal length of the lens 80 at the large end of the device has a focal length approximately equal to the axial length of the device. This lens serves to focus down light, which approaches from the left-hand side in the figure, to a focal spot located near the end of the tapered region of the lensing duct. The hole 82 in the lens is located such that it is on the axis of the lensing duct and is approximately of the same size or slightly larger than the exit hole 84 at the small end of the lensing duct. The reflective sides 86, 88 of the hollow lens duct are shown to be planar. However, other configurations are possible. For example, the reflective sides can be continuously curved, as in a funnel, with a round input end and a round output end. Alternatively, as shown in FIGS. 4A and 4B, the sides can be continuously graded shapes that take a rectangular input end 90 down to an output end 92, which may take on variously shaped exit holes beyond simple squares or circles, such as rectangles, octagons and ovals.

The reflective sides of the lens duct can be fabricated by machining an appropriately shaped cavity in a solid piece of metal, followed by polishing, and, if appropriate, applying a highly reflective coating such as gold or silver. Alternatively, these sides can be made out of individual pieces of a material such as glass or metal with an appropriate metallic or dielectric coating applied to their surface so as to render them highly reflective.

The lens at the input surface will generally be an ordinary, commercially available lens that is modified by cutting it to the shape of the input aperture and by fabricating a hole in its center to allow optical access to the end of the laser rod or slab. Although the optical access hole is shown to be round in FIG. 3, it can have other shapes if appropriate. For example, if a hollow lens duct were to be used to pump a laser slab with a rectangular input aperture, then it might be advantageous to have the optical access hole fabricated with a rectangular cross-section to match this aperture.

Changes and modifications in the specifically described embodiments can be carried out without departing from the scope of the invention, which is intended to be limited by the scope of the appended claims.

What is claimed is:

1. A hollow lens duct, comprising:

a lens which includes a hole;

a hollow optical cavity that tapers down in cross-section and has a highly reflective interior, wherein said hollow optical cavity includes an input end, an output end, and wherein said highly reflective interior connects said input end to said output end, wherein said input end has a greater cross-section than said output end and is connected to said lens.

2. The hollow lens duct of claim 1, wherein said lens is selected from a group consisting of a front spherical lens and a cylindrical lens, wherein said lens includes an antireflective material.

3. The hollow lens duct of claim 1, wherein said highly reflective interior comprises a coating selected from a group consisting of a metallic surface coating and a dielectric surface coating.

4. The hollow lens duct of claim 1, wherein said highly reflective interior includes at least one continuously extending flat side that tapers down from said input end to said output end.

5. The hollow lens duct of claim 1, wherein said highly reflective interior comprises four sides, and wherein at least two opposite sides of said four sides are tapered from said input end to said output end.

6. The hollow lens duct of claim 5, wherein said lens is selected from a group consisting of a front spherical lens and a cylindrical lens.

7. The hollow lens duct of claim 6, wherein said lens is selected from a group consisting of a front spherical lens and a cylindrical lens.

8. The hollow lens duct of claim 1, wherein said hollow lens duct has a length that is approximately equal to the focal length of said lens.

9. A hollow lensing duct for intensifying a light beam, comprising:

a hollow cavity including a lens at an input end having an antireflective coating thereon, and an output end, said input end and said output end being connected by reflective sides which perform a waveguide function, wherein each side of said reflective sides define a continuous flat surface, and wherein said lens has a greater cross-section at said input end than at said output end.

10. The lensing duct of claim 9, wherein said hollow cavity comprises material selected from a group consisting metal, ceramic, glass and plastic.

11. The lensing duct of claim 9, wherein at least one of said continuous flat surfaces is tapered.

12. An apparatus for intensifying a beam of light, comprising:

a hollow lens duct fabricated from material selected from a group consisting of metal, ceramic, glass and plastic, wherein said material can be polished, wherein said hollow lens duct includes an input end and an output end interconnected by a continuously tapering section, wherein said input end includes a lens selected from a group consisting of a spherical lens and a cylindrical lens, wherein said lens comprises an anti-reflective coating.

13. The apparatus of claim 12, wherein said antireflective coating is MgF2.

14. The apparatus of claim 13, wherein said antireflective coating has a thickness of about 3000 Angstroms.

15. The apparatus of claim 12, wherein said tapering section comprises four sides, at least two of said sides tapering down from said input end to said output end.

16. The apparatus of claim 12, wherein said hollow lens duct has an axial length, L, defined by the formula L=~F (L is approximately equal to F), where F is the focal length of the lens at the input end of the duct.

17. A hollow lens duct, comprising:

a lens; and a hollow optical cavity that tapers down in cross-section and has a highly reflective interior, wherein said hollow optical cavity includes an input end, an output end, and wherein said highly reflective interior connects said input end to said output end, wherein said input end has a greater cross-section than said output end and is connected to said lens.

18. The hollow lens duct of claim 17, wherein said lens includes a hole.

* * * * *